United States Patent
Nozawa

(10) Patent No.: US 8,922,766 B2
(45) Date of Patent: Dec. 30, 2014

(54) SPECTROMETER

(71) Applicant: Seiko Epson Corporation, Tokyo (JP)

(72) Inventor: Takeshi Nozawa, Fujimi (JP)

(73) Assignee: Seiko Epson Corporation (JP)

( * ) Notice: Subject to any disclaimer, the term of this patent is extended or adjusted under 35 U.S.C. 154(b) by 261 days.

(21) Appl. No.: 13/646,935

(22) Filed: Oct. 8, 2012

(65) Prior Publication Data

US 2013/0107260 A1     May 2, 2013

(30) Foreign Application Priority Data

Nov. 2, 2011   (JP) ................. 2011-240914

(51) Int. Cl.

| | |
|---|---|
| *G01J 3/00* | (2006.01) |
| *G01J 3/10* | (2006.01) |
| *G01J 3/02* | (2006.01) |
| *G01J 3/32* | (2006.01) |
| *G01J 3/42* | (2006.01) |
| *G02B 26/00* | (2006.01) |
| *G01J 3/26* | (2006.01) |

(52) U.S. Cl.
CPC .... *G01J 3/42* (2013.01); *G01J 3/10* (2013.01); *G01J 3/0297* (2013.01); *G01J 3/32* (2013.01); *G01J 3/027* (2013.01); *G02B 26/001* (2013.01); *G01J 3/26* (2013.01)
USPC .......................................... 356/300

(58) Field of Classification Search
CPC ................ G01J 3/02; G01J 3/28; G01J 3/42; G01N 21/31; G01N 21/552
USPC ........................................... 356/300
See application file for complete search history.

(56) References Cited

U.S. PATENT DOCUMENTS

| | | |
|---|---|---|
| 7,773,802 B2 | 8/2010 | Komiya et al. |
| 7,889,919 B2 | 2/2011 | Komiya et al. |
| 2010/0165629 A1 | 7/2010 | Haga et al. |
| 2012/0013905 A1* | 1/2012 | Nozawa ................. 356/326 |

FOREIGN PATENT DOCUMENTS

| | | |
|---|---|---|
| JP | 2002-296116 | 10/2002 |
| JP | 2008-283692 | 11/2008 |
| JP | 2009-031245 | 2/2009 |
| JP | 2009-168478 | 7/2009 |
| JP | 2009-281929 | 12/2009 |

* cited by examiner

*Primary Examiner* — Tarifur Chowdhury
*Assistant Examiner* — Md Rahman
(74) *Attorney, Agent, or Firm* — Harness, Dickey & Pierce, P.L.C.

(57) ABSTRACT

A spectrometer includes a light source section that includes a plurality of LEDs having different emission wavelengths, a variable wavelength interference filter that selectively extracts light of a predetermined wavelength, a detector that detects the amount of light, and a control circuit section. The control circuit section includes a mode switching section that switches a calibration mode and a measurement mode, an outside light analysis section that analyzes characteristics of outside light in the calibration mode, a reference light setting section that set the amount of light emitted from each of the LEDs on the basis of the characteristics of the outside light, and a light source driving section that drives each of the LEDs on the basis of the amount of light emitted which is set in the measurement mode.

15 Claims, 10 Drawing Sheets

SPECTROMETER

BACKGROUND

1. Technical Field

The present invention relates to a spectrometer.

2. Related Art

Hitherto, spectrometers that irradiate an object to be measured with light from a light source and detect light reflected or transmitted from or through the object to be measured have been known (see for example, JP-A-2002-296116).

The spectrometer (multi-channel spectrometer) disclosed in JP-A-2002-296116 irradiates a sample (object to be measured) with light from a light source and causes light reflected from the object to be measured to be incident on an interference filter. Light extracted by the interference filter is received in a photodiode array (detection section).

Incidentally, in the spectrometer disclosed in JP-A-2002-296116, the optical spectrum of the object to be measured is measured by emitting reference light (for example, white light) from the light source. However, outside light other than the light source may be incident on the object to be measured depending on the measurement environment or the like. In this case, there has been a problem in that the optical spectrum cannot be measured precisely.

SUMMARY

An advantage of some aspects of the invention is to provide a spectrometer capable of measuring the spectral characteristics with a high degree of accuracy.

An aspect of the invention is directed to a spectrometer including: a light source section that includes a plurality of light-emitting elements having different emission wavelengths and emits reference light, with which light emitted from the light-emitting elements is mixed, to an object; a wavelength selection element that selectively extracts light of a predetermined wavelength from light reflected or transmitted from or through the object; a detection section that detects the amount of light extracted from the wavelength selection element; and a control section, wherein the control section includes a mode switching section that switches a calibration mode for performing a calibration using the object as a reference calibration object, and a measurement mode for measuring spectral characteristics of an object to be measured using the object as the object to be measured, an outside light analysis section that analyzes a characteristics of outside light in the calibration mode, a reference light setting section that sets the amount of light emitted from each light-emitting element of the light source section, in the calibration mode, on the basis of the characteristics of the outside light analyzed by the outside light analysis section, and a light source driving section that drives the light-emitting elements, in the measurement mode, on the basis of the amount of light emitted which is set by the reference light setting section.

In the aspect of the invention, at the time of switching to the calibration mode, a calibration for adjusting the amount of light emitted from the light-emitting elements using the object as a reference calibration object is performed. As the reference calibration object, for example, an object, such as a white calibration plate, in which reflectance for each wavelength is measured in advance can be used.

In the aspect of the invention, the reference light is emitted from the light source section to the object, light reflected from the object is caused to be incident on the wavelength selection element, and light extracted from the wavelength selection element is detected in the detection section. The light source section is constituted by a plurality of light-emitting elements having different emission wavelengths, and the emission states of the light-emitting elements are controlled by the light source driving section, so that light of each wavelength is mixed and thus the reference light is generated.

Incidentally, when spectrometry is performed using the spectrometer, light reflected from the object may contain outside light components, in addition to the reference light emitted from the light source section. When such outside light components enter, a precise spectrometry may not be able to be performed. For example, when a large amount of outside light having a specific wavelength enters, the amount of light for the specific wavelength detected by the detection section also increases, and the measurement accuracy of the object decreases.

On the other hand, in the aspect of the invention, it is possible to switch the calibration mode and the measurement mode through the mode switching section. The outside light analysis section analyzes the characteristics of the outside light in the calibration mode, and the reference light setting section sets the amount of light emitted from each of the light-emitting elements in accordance with the analyzed characteristics of the outside light.

In the measurement mode, the light source driving section drives each of the light-emitting elements with the amount of light emitted set by the calibration mode. Thereby, even when the outside light is incident, it is possible to emit the reference light in consideration of the outside light to the object to be measured, and to precisely measure the spectral characteristics using the spectrometer.

In addition, a correction of the measured value, for example, such as a signal gain adjustment is not required by setting, in this manner, the amount of light emitted from each of the light-emitting elements of the light source section in consideration of the outside light, and thus the spectral characteristics of the object can be easily measured.

Further, when a measurement is performed using one light source (light-emitting element), for example, such as a white light source, the amount of light of a specific wavelength region decreases. On the other hand, in the aspect of the invention, it is possible to set the amount of light of the light-emitting elements corresponding to each wavelength. Therefore, since the reference light having the amount of light suitable for measurement can be used for the entire wavelength region, it is possible to increase the signal strength, and to improve the S/N ratio.

In the spectrometer according to the aspect of the invention, it is preferable that the outside light analysis section acquires the amount of light for each wavelength of the outside light, as the characteristics of the outside light, and the reference light setting section calculates the amount of light emitted from the light-emitting elements corresponding to each wavelength, on the basis of the amount of light for each wavelength of the outside light.

According to this configuration, the outside light analysis section acquires the amount of light for each wavelength of the outside light, as the characteristics of the outside light.

That is, the outside light analysis section analyzes the spectral characteristics of the outside light. In this manner, the spectral characteristics of the outside light is analyzed, so that regarding the wavelength, for example, having an insufficient amount of light, the amount of light emitted from the light-emitting element may be set so as to make up for the shortfall thereof with that of light-emitting element, and the amount of light emitted from the light-emitting element may be set to be low with respect to the wavelength having an excessively large amount of light of the outside light. Thereby, it is possible to easily and particularly set the amount of light emitted from the light-emitting elements with respect to each wavelength, and to set optimum reference light in consideration of the outside light. Thereby, it is possible to improve measurement accuracy at the time of the operation of the spectrometer in the measurement mode.

In the spectrometer according to the aspect of the invention, it is preferable that the control section includes a storage section that stores sensitivity characteristics of the detection section for each wavelength capable of being selected by the wavelength selection element, and spectral characteristics of the wavelength selection element for each wavelength capable of being selected by the wavelength selection element, and the reference light setting section calculates the amount of light emitted from the light-emitting elements corresponding to each wavelength so that the sum of an outside light characteristic value calculated on the basis of the amount of light for each wavelength of the outside light, the sensitivity characteristics of the detection section and the spectral characteristics of the wavelength selection element, and a reference light characteristic value calculated on the basis of the amount of light emitted from the light-emitting elements for each wavelength, the sensitivity characteristics of the detection section and the spectral characteristics of the wavelength selection element is equal to a set value corresponding to reflectance for each wavelength of the reference calibration object.

In this configuration, in the calibration mode, the reference light setting section calculates the amount of light emitted from the light-emitting elements on the basis of the sensitivity characteristics of the detection section and the spectral characteristics of the wavelength selection element so that the measured value (outside light characteristic value+reference light characteristic value) of each wavelength detected by the detection section is equal to the amount of light (set value) corresponding to the reflectance of the reference calibration object.

Thereby, it is possible to set the amount of light emitted from the light-emitting elements in accordance with the characteristics of the detection section and the wavelength selection element in addition to the characteristics of the outside light, and to perform a measurement having a higher level of accuracy. In addition, since the amount of light emitted from the light-emitting element can be increased with respect to the low sensitivity band in which the sensitivity characteristics of the detection section and the spectral characteristics of the wavelength selection element are low, it is possible to increase the signal strength, and to achieve an improvement in the S/N ratio.

It is preferable that the spectrometer according to the aspect of the invention further includes a light-emission amount storage section that stores the amount of light emitted from the light-emitting elements corresponding to each wavelength, wherein the light source driving section drives the light source section, in the calibration mode, on the basis of the amount of light emitted from the light-emitting elements which is stored in the light-emission amount storage section, the outside light analysis section determines whether the amount of light for each wavelength of the outside light exceeds a predetermined value, as the characteristics of the outside light, and the reference light setting section reduces the amount of light emitted from the light-emitting elements corresponding to the wavelength, when the amount of light for the wavelength of the outside light exceeds the predetermined value.

According to this configuration, the outside light analysis section determines whether the amount of light of each wavelength of the outside light exceeds a predetermined value, and the reference light setting section reduces the amount of light emitted from the light-emitting elements with respect to the wavelength exceeding the predetermined value. The reference light which is set in this manner is used, so that it is possible to irradiate the object with a uniform amount of light (light obtained by mixing the reference light and the outside light) for each wavelength, and to precisely measure the spectral characteristics of the object.

It is preferable that the spectrometer according to the aspect of the invention further includes an outside light detection section that detects the amount of light for each wavelength of the outside light, wherein the outside light analysis section analyzes the characteristics of the outside light on the basis of a detection result of the outside light detection section.

According to this configuration, the outside light detection section for detecting the amount of the outside light is provided, and the outside light analysis section analyzes the characteristics of the outside light on the basis of a detection result of the outside light detection section. In this manner, in the configuration in which the outside light detection section is provided, it is possible to analyze the characteristics of only the outside light even in a state where the reference light is emitted from the light source section. Therefore, for example, in the measurement mode, it is also possible to analyze the characteristics of the outside light. It is preferable that the spectrometer according to the aspect of the invention further includes: an outside light characteristic storage section that stores the amount of light for each wavelength of the outside light; and an outside light monitoring section that calculates a variation in the amount of light for each wavelength, when there is a change in the amount of the outside light in the measurement mode, wherein the reference light setting section corrects the amount of light emitted from the light-emitting elements, on the basis of the variation in the amount of light which is calculated by the outside light monitoring section.

According to this configuration, since only the outside light can be detected separately from the reference light by the outside light detection section, it is possible to analyze the outside light, for example, in outside light analysis section even in the measurement mode. The reference light setting section corrects the amount of light emitted from the light-emitting elements when a variation is calculated by the outside light monitoring section in the measurement mode. For this reason, even when the amount of the outside light fluctuates, for example, in the measurement mode, it is possible to change the amount of light emitted for each wavelength of the reference light in accordance with the outside light, and to suppress a decrease in measurement accuracy.

In the spectrometer according to the aspect of the invention, it is preferable that the wavelength selection element is a variable wavelength interference filter including: a first substrate; a second substrate that faces the first substrate; a first reflective film provided on the first substrate; a second reflective film, provided on the second substrate, which faces the first reflective film with a gap between the reflective films interposed therebetween; and a gap change section that changes a size of the gap between the reflective films.

The wavelength selection element may have a configuration, for example, in which a plurality of color filters are switched. However, in this case, since it is necessary to use a plurality of color filters opposite to the wavelength to be measured, the device is considered to become more complicated. On the other hand, in the aspect of the invention, since the variable wavelength interference filter capable of changing the size of the gap between the first reflective film and the second reflective film is used as the wavelength selection element, it is possible to selectively extract light of multiple wavelengths using one filter, and to simplify the configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Configuration of Spectrometer

Figure 1:
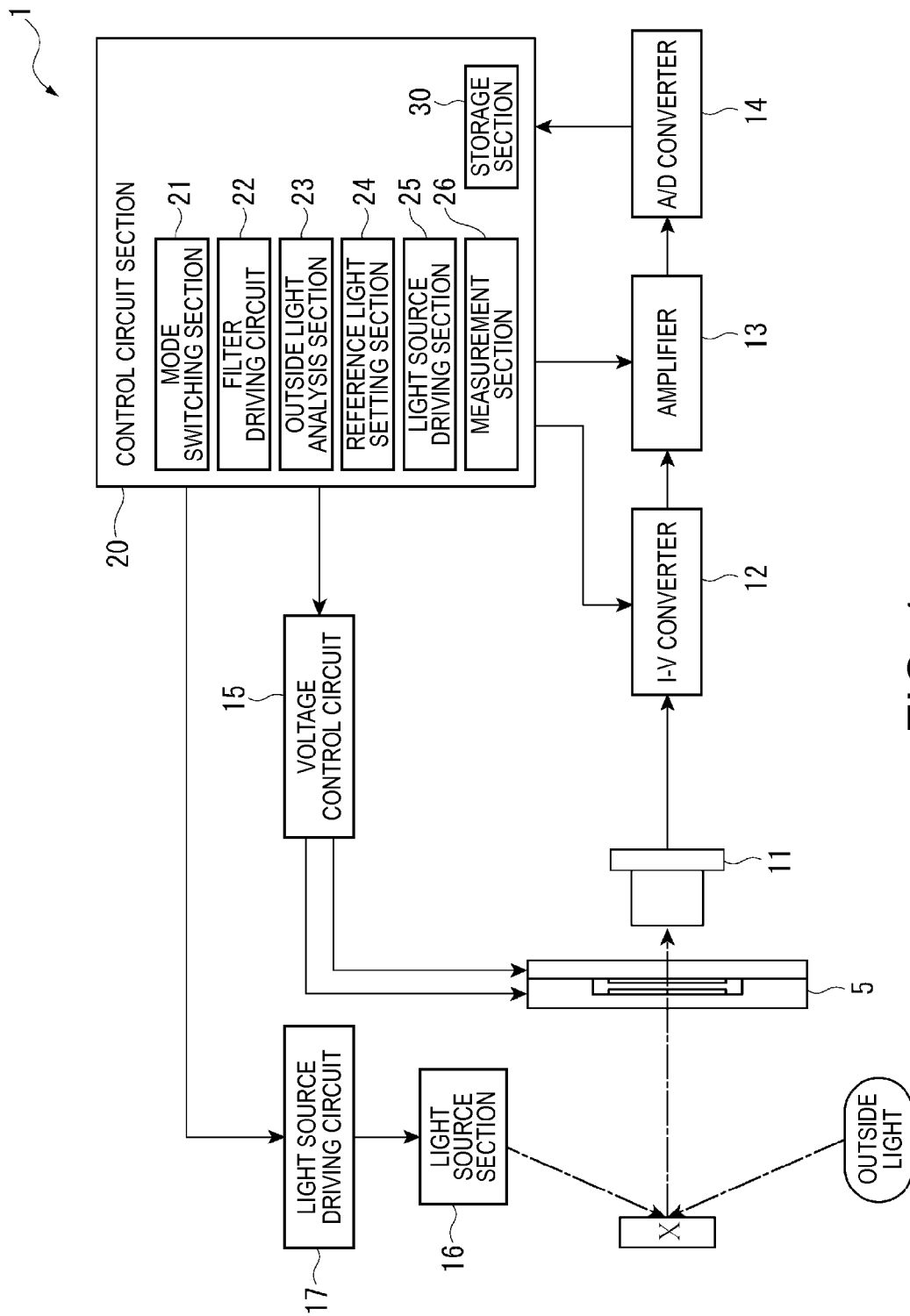
FIG. 1 is a block diagram illustrating a schematic configuration of a spectrometer according to a first embodiment of the invention.

FIG. 1 is a block diagram illustrating a schematic configuration of a spectrometer according to the embodiment of the invention.

A spectrometer 1 is a device that acquires the amount of light (light intensity) of each wavelength in light to be measured which is reflected from an object X and measures the spectral characteristics of the light to be measured, and, particularly, measures the spectral characteristics covering a visible light region to a near-infrared light region.

As shown in FIG. 1, the spectrometer 1 includes a variable wavelength interference filter 5, a detector 11 (detection section), an I-V converter 12, an amplifier 13, an A/D converter 14, a voltage control circuit 15, a light source section 16, a light source driving circuit 17, and a control circuit section 20 (control section).

Configuration of Variable Wavelength Interference Filter

Figure 2:
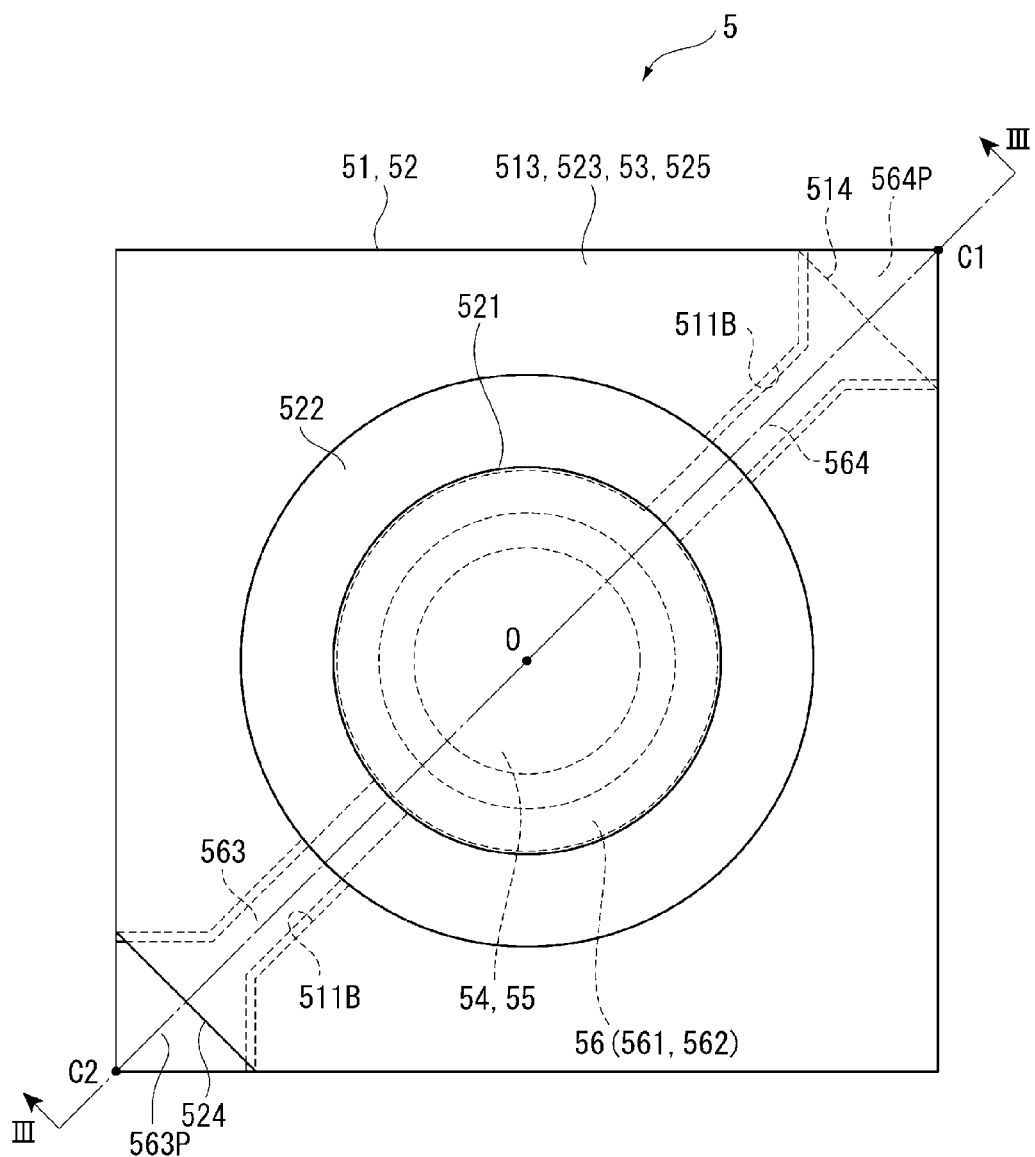
FIG. 2 is a plan view illustrating a schematic configuration of a variable wavelength interference filter according to the first embodiment.
Figure 3:
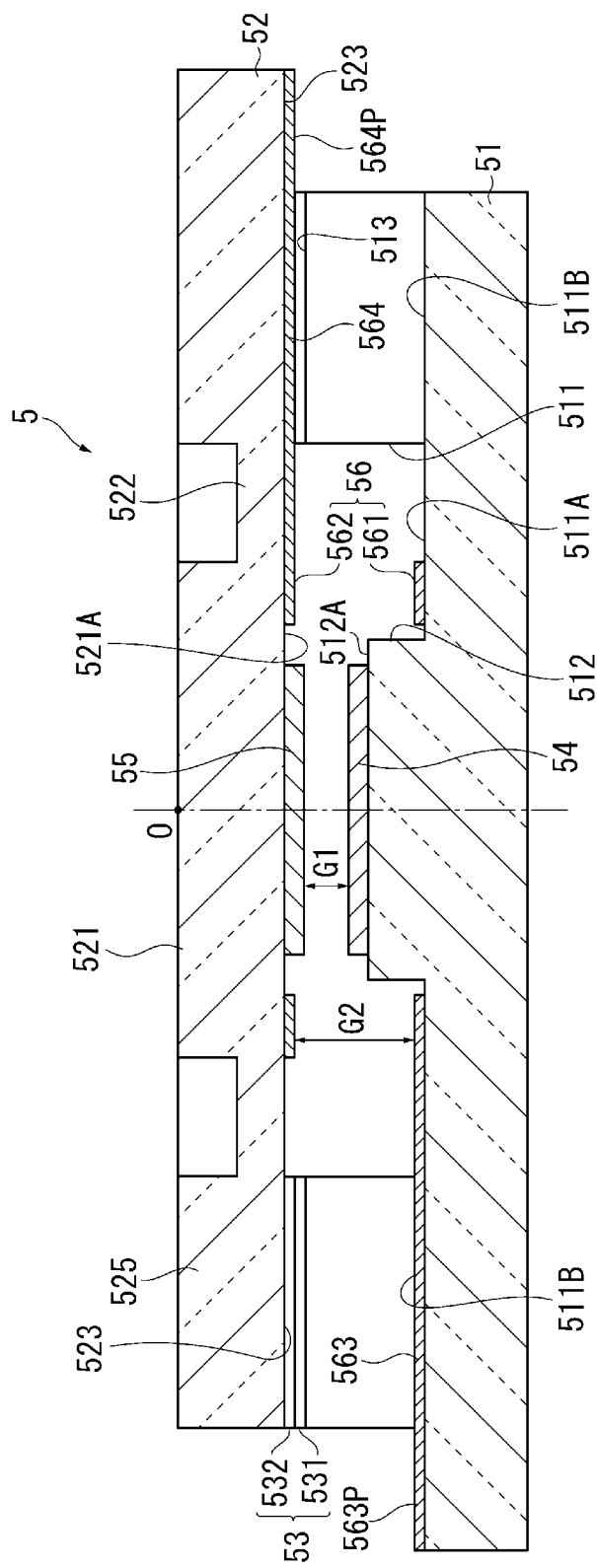
FIG. 3 is a cross-sectional view illustrating a schematic configuration of the variable wavelength interference filter according to the first embodiment.

Here, the variable wavelength interference filter 5 incorporated in the spectrometer 1 will be described below. FIG. 2 is a plan view illustrating a schematic configuration of the variable wavelength interference filter. FIG. 3 is a cross-sectional view taken along the line III-III of FIG. 2. The variable wavelength interference filter 5 is an optical member constituting a wavelength selection element according to the embodiment of the invention. As shown in FIGS. 2 and 3, the variable wavelength interference filter 5 includes a fixed substrate 51 and a movable substrate 52. The fixed substrate 51 and the movable substrate 52 are formed of, for example, various types of glass such as soda glass, crystalline glass, silica glass, lead glass, potassium glass, borosilicate glass, and non-alkali glass, quartz crystal, or the like. The fixed substrate 51 and the movable substrate 52 are integrally formed through the bonding of a first bonding portion 513 of the fixed substrate 51 to a second bonding portion 523 of the movable substrate using a bonding film 53 (first bonding film 531 and second bonding film 532) which is constituted by, for example, a siloxane-based plasma polymerized film and the like. The fixed substrate 51 is provided with a fixed reflective film 54 constituting a first reflective film of the embodiment of the invention, and the movable substrate 52 is provided with a movable reflective film 55 constituting a second reflective film of the embodiment of the invention. The fixed reflective film 54 and the movable reflective film 55 are arranged opposite to each other with a gap G1 between the reflective films interposed therebetween. The variable wavelength interference filter 5 is provided with an electrostatic actuator 56 used for adjusting (changing) the size of the gap G1 between the reflective films. The electrostatic actuator is equivalent to a gap amount change portion in the embodiment of the invention. The electrostatic actuator 56 is constituted by a fixed electrode 561 provided on the fixed substrate 51 and a movable electrode 562 provided on the movable substrate 52. The fixed electrode 561 and the movable electrode 562 face each other with an inter-electrode gap G2 interposed therebetween. Here, the electrodes 561 and 562 may be provided directly on the surfaces of the fixed substrate 51 and the movable substrate 52, respectively, and may be provided through another film member. Here, the size of the inter-electrode gap G2 is larger than the size of the gap G1 between the reflective films.

In addition, in the planar view of the filter as shown in FIG. 2 when the variable wavelength interference filter 5 is viewed from in the thickness direction of the fixed substrate 51 (movable substrate 52), the planar center point O of the fixed substrate 51 and the movable substrate 52 coincides with the center point of the fixed reflective film 54 and the movable reflective film 55, and coincides with the center point of a movable portion 521 described later.

Meanwhile, in the following description, the planar view as viewed from the thickness direction of the fixed substrate 51 or the movable substrate 52, that is, the planar view as the variable wavelength interference filter 5 is viewed from the lamination direction of the fixed substrate 51, the bonding film 53, and the movable substrate 52 is referred to as the planar view of the filter.

Configuration of Fixed Substrate

An electrode arrangement groove 511 and a reflective film installing portion 512 are formed on the fixed substrate 51 through etching. The fixed substrate 51 is formed so as to have a thickness larger than that of the movable substrate 52, and thus there is no electrostatic attractive force generated by applying a voltage between the fixed electrode 561 and the movable electrode 562, or no bending of the fixed substrate 51 due to internal stress of the fixed electrode 561.

In addition, a notch portion 514 is formed at the vertex C1 of the fixed substrate 51, and a movable electrode pad 564P described later is exposed to the fixed substrate 51 side of the variable wavelength interference filter 5.

The electrode arrangement groove 511 is formed in a circular shape centered on the planar center point O of the fixed substrate 51 in the planar view of the filter. In the above-mentioned planar view, the reflective film installing portion 512 is formed so as to protrude from the central portion of the electrode arrangement groove 511 to the movable substrate 52 side. The groove bottom of the electrode arrangement groove 511 is an electrode installing surface 511A on which the fixed electrode 561 is disposed. In addition, the protruding apical surface of the reflective film installing portion 512 is a reflective film installing surface 512A.

In addition, the fixed substrate 51 is provided with electrode extraction grooves 511B extending from the electrode arrangement groove 511 toward the vertex C1 and the vertex C2 of the outer circumferential edge of the fixed substrate 51.

The fixed electrode 561 is provided on the electrode installing surface 511A of the electrode arrangement groove 511. More specifically, the fixed electrode 561 is provided on a region facing the movable electrode 562 of the movable portion 521, described later, in the electrode installing surface 511A. In addition, an insulating film for securing insulating properties between the fixed electrode 561 and the movable electrode 562 may be laminated on the fixed electrode 561. The fixed substrate 51 is provided with a fixed extraction electrode 563 extending from the outer circumferential edge of the fixed electrode 561 to the direction of the vertex C2. The extending apical portion (portion located at the vertex C2 of the fixed substrate 51) of the fixed extraction electrode 563 constitutes a fixed electrode pad 563P connected to the voltage control circuit 15.

Meanwhile, in the embodiment, the configuration is shown in which one fixed electrode 561 is provided on the electrode installing surface 511A, but a configuration (double electrode configuration) or the like may be formed, for example, in which two electrodes having a concentric circle centered on the planar center point O are provided.

As mentioned above, the reflective film installing portion 512 is formed coaxially with the electrode arrangement groove 511 and in a substantially cylindrical shape having a diameter smaller than that of the electrode arrangement groove 511, and includes the reflective film installing surface 512A that faces the movable substrate 52 of the reflective film installing portion 512.

As shown in FIG. 3, the fixed reflective film 54 is installed on the reflective film installing portion 512. As the fixed reflective film 54, for example, a metal film such as Ag, an alloy film such as an Ag alloy can be used. In addition, for example, a dielectric multilayer film in which a high refractive layer is formed of $TiO_2$ and a low refractive layer is formed of $SiO_2$ may be used. Further, a reflective film in which a metal film (or alloy film) is laminated on a dielectric multilayer film, a reflective film in which a dielectric multilayer film is laminated on a metal film (or an alloy film), a reflective film in which a single-layer refractive layer (such as $TiO_2$ or $SiO_2$) and a metal film (or an alloy film) are laminated, or the like may be used.

In addition, on the light incidence plane (plane on which the fixed reflective film 54 is not provided) of the fixed substrate 51, an anti-reflective film may be formed at a position corresponding to the fixed reflective film 54. Since this anti-reflective film can be formed by alternately laminating a low refractive index film and a high refractive index film, the reflectance of visible light from the surface of the fixed substrate 51 is reduced, and the transmittance thereof is increased.

Among the surfaces of the fixed substrate 51 that face the movable substrate 52, the surface on which the electrode arrangement groove 511, the reflective film installing portion 512, and the electrode extraction grooves 511B are not formed through etching constitutes the first bonding portion 513. The first bonding portion 513 is provided with the first bonding film 531, and the first bonding film 531 is bonded to the second bonding film 532 provided on the movable substrate 52, so that the fixed substrate 51 and the movable substrate 52 are bonded to each other, as mentioned above.

Configuration of Movable Substrate

In the planar view of the filter as shown in FIG. 2, the movable substrate 52 includes the circle-shaped movable portion 521 centered on the planar center point O, a holding portion 522 which is coaxial with the movable portion 521 and holds the movable portion 521, and a substrate outer circumferential portion 525 provided outside the holding portion 522.

In addition, as shown in FIG. 2, a notch portion 524 is formed in the movable substrate 52, corresponding to the vertex C2, and thus the fixed electrode pad 563P is exposed when the variable wavelength interference filter 5 is viewed from the movable substrate 52 side.

The movable portion 521 is formed so as to have a thickness larger than that of the holding portion 522, and is formed so as to have the same thickness as that of the movable substrate 52, for example, in the embodiment. In the planar view of the filter, the movable portion 521 is formed so as to have a diameter larger than at least the diameter of the outer circumferential edge of the reflective film installing surface 512A. The movable portion 521 is provided with the movable electrode 562 and the movable reflective film 55.

Meanwhile, similarly to the fixed substrate 51, an anti-reflective film may be formed on the surface of the movable portion 521 on the opposite side to the fixed substrate 51. Such an anti-reflective film can be formed by alternately laminating a low refractive index film and a high refractive index film, thereby allowing the reflectance of visible light from the surface of the movable substrate 52 to be reduced, and the transmittance thereof to be increased.

The movable electrode 562 faces the fixed electrode 561 with the inter-electrode gap G2 interposed therebetween, and is formed in a circular shape having the same shape as that of the fixed electrode 561. In addition, the movable substrate 52 includes a movable extraction electrode 564 extending from the outer circumferential edge of the movable electrode 562 toward the vertex C1 of the movable substrate 52. The extending apical portion (portion located at the vertex C1 of the movable substrate 52) of the movable extraction electrode 564 constitutes the movable electrode pad 564P connected to the voltage control circuit 15.

On the central portion of a movable surface 521A of the movable portion 521, the movable reflective film 55 is provided facing the fixed reflective film 54 with the gap G1 between the reflective films interposed therebetween. As the movable reflective film 55, a reflective film having the same configuration as that of the above-mentioned fixed reflective film 54 is used.

Meanwhile, in the embodiment, as mentioned above, an example is illustrated in which the size of the inter-electrode gap G2 is larger than the size of the gap G1 between the reflective films, but is not limited thereto. For example, in the case, or the like, where infrared rays or far-infrared rays are used as light to be measured, the size of the gap G1 between the reflective films may be larger than the size of the inter-electrode gap G2, depending on the wavelength region of light to be measured.

The holding portion 522 is a diaphragm that surrounds the periphery of the movable portion 521, and is formed so as to have a thickness smaller than that of the movable portion 521. Such a holding portion 522 is more likely to be bent than the movable portion 521, and thus can cause the movable portion 521 to be displaced to the fixed substrate 51 side due to slight electrostatic attractive force. At this time, the movable portion 521 has a thickness larger than that of the holding portion 522, and has a rigidity larger than that. Thus, even when the holding portion 522 is pulled to the fixed substrate 51 side due to electrostatic attractive force, a change in the shape of the movable portion 521 is not caused. Therefore, the movable reflective film 55 provided on the movable portion 521 is not only bent, but also the fixed reflective film 54 and movable reflective film 55 can always be maintained to the parallel state.

Meanwhile, in the embodiment, the diaphragm-shaped holding portion 522 is illustrated by way of example, but without being limited thereto, for example, beam-shaped holding portions which are disposed at equiangular intervals centered on the planar center point O may be provided.

As mentioned above, the substrate outer circumferential portion 525 is provided outside the holding portion 522 in the planar view of the filter. The surface of the substrate outer circumferential portion 525 that faces the fixed substrate 51 includes the second bonding portion 523 that faces the first bonding portion 513. The second bonding portion 523 is provided with the second bonding film 532, and the second bonding film 532 is bonded to the first bonding film 531 as mentioned above, so that the fixed substrate 51 and the movable substrate 52 are bonded to each other.

In the above-mentioned variable wavelength interference filter 5, the fixed electrode pad 563P and the movable electrode pad 564P are connected to the voltage control circuit 15. Therefore, a voltage is applied between the fixed electrode 561 and the movable electrode 562 by the voltage control circuit 15, so that the movable portion 521 is displaced to the fixed substrate 51 side due to electrostatic attractive force. Thereby, it is possible to change the size of the gap G1 between the reflective films to a predetermined amount.

Next, the transmission characteristics of the variable wavelength interference filter as mentioned above will be described.

Figure 4:
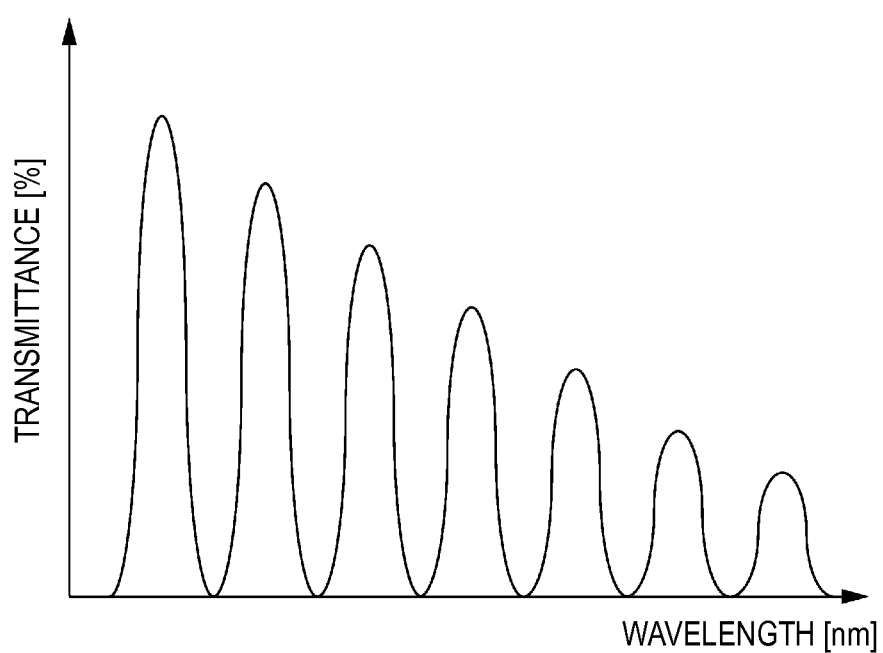
FIG. 4 is a diagram illustrating the spectral characteristics of the variable wavelength interference filter according to the first embodiment.

FIG. 4 is a diagram illustrating the transmission characteristics (near infrared) of the variable wavelength interference filter 5.

As shown in FIG. 4, the transmittance of the variable wavelength interference filter 5 changes depending on transmission wavelengths.

Generally, when the amount of light for each wavelength is the same, light energy increases as the wavelength is shorter, and light energy decreases as the wavelength is longer. Therefore, the spectral characteristics (transmission characteristics) in the near infrared region of the variable wavelength interference filter 5 have a tendency to show a decrease in transmittance toward the long wavelength region, as shown in FIG. 4.

In addition, the transmission characteristics of the variable wavelength interference filter 5 also change, for example, depending on the material or the like of the fixed reflective film 54 or the movable reflective film 55. For example, when a metal film and a metal alloy film such as Ag and an Ag alloy are used as the reflective films 54 and 55, the transmittance thereof may decrease due to the light absorption characteristics of the reflective films 54 and 55. Meanwhile, when a dielectric multilayer film is used as the reflective films 54 and 55, the wavelength region to be measured becomes narrower, but it is possible to cause the transmission characteristics to be uniform with respect to each wavelength.

Configuration of Detector

Referring back to FIG. 1, the detector 11 receives light passing through the variable wavelength interference filter 5, and outputs a detection signal (current) in accordance with the amount of light received.

In the embodiment, as the detector 11, a Si photodiode is used which is capable of outputting a detection signal in accordance with the amount of light received by receiving light of the wavelength region from the ultraviolet region to the near-infrared region.

Figure 5:
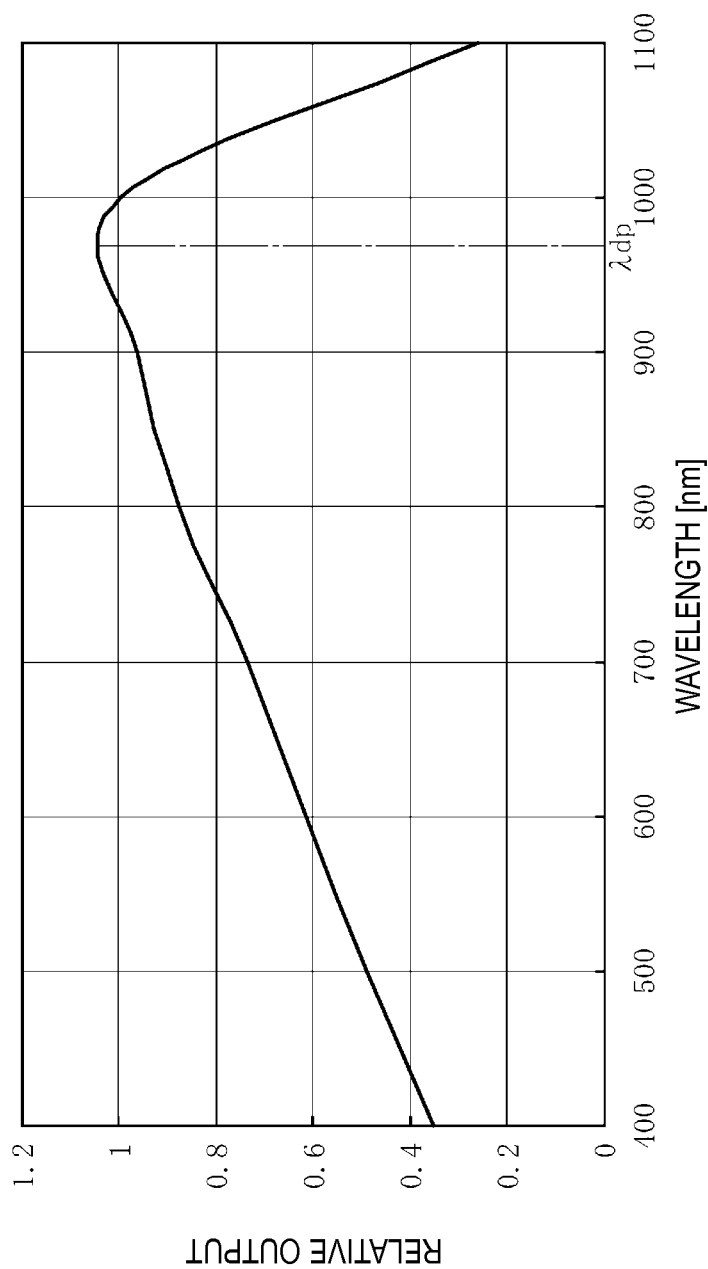
FIG. 5 is a diagram illustrating the sensitivity characteristics of a detector (detection section) according to the first embodiment.

FIG. 5 is a diagram illustrating the detection sensitivity characteristics in the detector of the embodiment. The detector 11 has a different sensitivity (relative output) with respect to each light-receiving wavelength. That is, even when light of wavelength A and light of wavelength B which have the same amount of light are received by the detector 11, the detection signal which is output from the detector 11 has a different value.

For example, as shown in FIG. 5, the Si photodiode of the embodiment has a peak sensitivity wavelength $\lambda_{dp}$ in which the sensitivity is best between 900 to 1,000 nm, and has a sharp decrease in sensitivity with respect to light of the wavelength larger than the peak sensitivity wavelength$_{dp}$. In addition, it has a gentle decrease in sensitivity as the wavelength is smaller, with respect to light of the wavelength smaller than the peak sensitivity wavelength $\lambda_{dp}$.

Configuration of I-V Converter, A/D Converter, and Voltage Control Circuit

The I-V converter 12 converts a detection signal which is input from the detector 11 into a voltage value, and outputs the converted value to the amplifier 13.

The amplifier 13 amplifies a voltage (detection voltage) in accordance with the detection signal which is input from the I-V converter 12.

The A/D converter 14 converts a detection voltage (analog signal) which is input from the amplifier 13 into a digital signal, and outputs the converted signal to the control circuit section 20.

The voltage control circuit 15 applies a driving voltage to the electrostatic actuator 56, described later, of the variable wavelength interference filter 5, on the basis of the control of the control circuit section 20.

Configuration of Light Source Section and Light Source Driving Circuit

Figure 6:
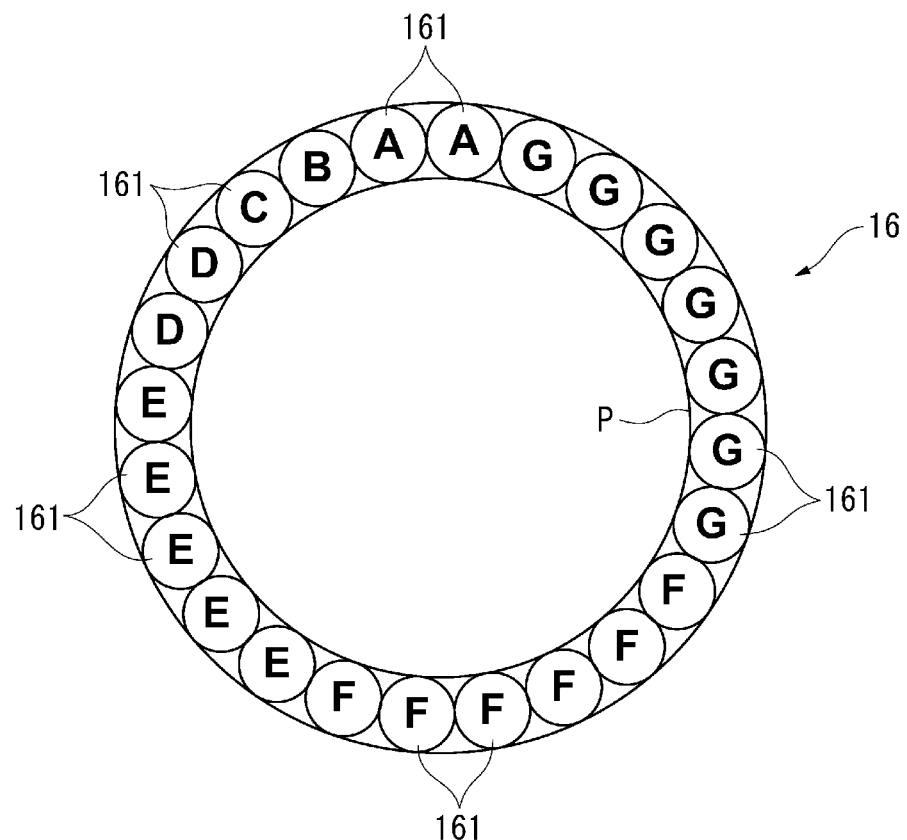
FIG. 6 is a diagram illustrating an arrangement configuration of LEDs constituting a light source section according to the first embodiment.

FIG. 6 is a schematic diagram illustrating a schematic configuration of the light source section 16.

The light source section 16 emits reference light to the object X. As shown in FIG. 6, the light source section 16 includes a plurality of LEDs (light-emitting elements) 161 having different emission wavelengths.

Here, the light source section 16 includes at least one LED 161 corresponding to each emission wavelength. For example, in the example shown in FIG. 6, the light source section 16 includes two LEDs 161 corresponding to wavelength A, one LED 161 corresponding to wavelength B, one LED 161 corresponding to wavelength C, two LEDs 161 corresponding to wavelength D, five LEDs 161 corresponding to wavelength E, six LEDs 161 corresponding to wavelength F, and seven LEDs 161 corresponding to wavelength G.

The number of LEDs 161 corresponding to each wavelength is set by the amount of light emitted from each of the LEDs 161, the sensitivity characteristics of the detector 11, the transmission characteristics of the variable wavelength interference filter 5, and the like. For example, the number of LEDs 161 having a small amount of light emitted, the number of LEDs 161 corresponding to the wavelength having a low sensitivity of the detector 11, and the number of LEDs 161 corresponding to the wavelength having low transmission characteristics of the variable wavelength interference filter 5 are larger than the number of other LEDs 161. On the other hand, the number of LEDs 161 having a large amount of light emitted, the number of LEDs 161 corresponding to the wavelength having a high sensitivity of the detector 11, and the number of LEDs 161 corresponding to the wavelength having high transmission characteristics of the variable wavelength interference filter 5 are smaller than the number of other LEDs 161.

In addition, the LEDs 161 in the light source section 16 are arranged lined up in a annular shape along the virtual circle P. In addition, the light source section 16 includes a reflector that mixes light emitted from each of the LEDs 161, and the like, and emits mixed light of each wavelength, which is emitted from the LEDs 161, as reference light.

Figure 7:
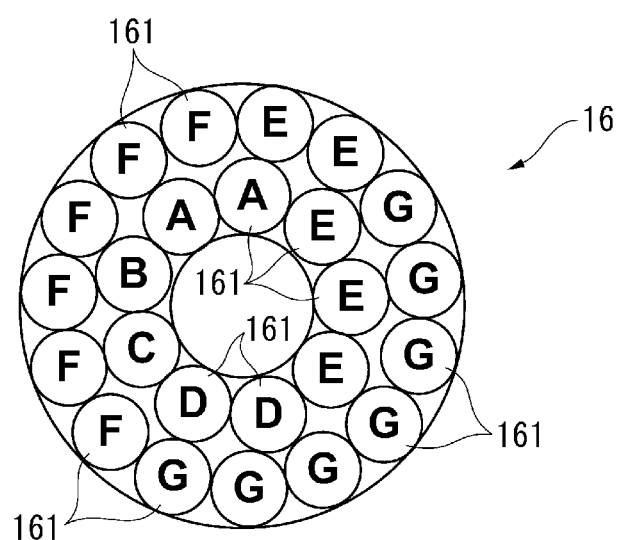
FIG. 7 is a diagram illustrating another example of the arrangement configuration of the LEDs constituting the light source section.

Meanwhile, the arrangement of the LEDs 161 is not limited to the arrangement shown in FIG. 6. For example, as shown in FIG. 7, a configuration may be used in which the LEDs are arranged in an annular shape along a plurality of virtual circles forming a concentric circle. FIG. 7 is a schematic diagram illustrating another example of the LEDs 161 in the light source section 16. In such an arrangement, for example, a configuration may be used in which the small number of LEDs 161 (for example, in the example shown in FIG. 7, LEDs 161 corresponding to wavelengths A, B, C, D, and E) are arranged on the internal diameter side, and the large number of LEDs 161 (for example, in the example shown in FIG. 7, LEDs 161 corresponding to wavelengths E, F, and G) are arranged on the external diameter side. The arrangement balance of the LEDs 161 can be made to be uniform through such a configuration. In addition, in FIGS. 6 and 7, although configuration examples are shown in which the LEDs 161 corresponding to the same wavelength are arranged next to each other, the LEDs 161 corresponding to each wavelength may be uniformly arranged, for example, within the plane perpendicular to a light path of the reference light.

Further, in FIGS. 6 and 7, although the configurations in which the LEDs 161 are arranged along an annular ring are shown, the LEDs 161 may be arranged, for example, in a matrix.

The light source driving circuit 17 includes a switch circuit that switches the turn-on and turn-off of each LED 161 of the light source section 16.

The light source driving circuit 17 controls the switch circuit on the basis of a light source control signal which is input from the control circuit section 20, sets the LEDs 161 to be turned-on to an on-state, and applies a driving voltage to the LEDs 161 to be turned-on.

Configuration of Control Circuit Section

Next, the control circuit section 20 of the spectrometer 1 will be described.

The control circuit section 20 is configured by the combination of, for example, a CPU, a memory and the like, and controls the entire operation of the spectrometer 1. As shown in FIG. 1, the control circuit section 20 includes a mode switching section 21, a filter driving circuit 22, an outside light analysis section 23, a reference light setting section 24, a light source driving section 25, and a measurement section 26. In addition, the control circuit section 20 includes a storage section 30 that stores various types of data for controlling the spectrometer 1. V-λ data showing the relationship between a voltage applied to the electrostatic actuator 56 of the variable wavelength interference filter 5 and a wavelength of light that passes through the variable wavelength interference filter 5 is stored in the storage section 30. In addition, the transmission characteristics of the variable wavelength interference filter 5 as shown in FIG. 4 or the sensitivity characteristics of the detector 11 as shown in FIG. 5 are stored in the storage section 30. Further, the storage section 30 functions as a light-emission amount storage section and an outside light characteristic storage section of the embodiment of the invention, and the amount of light emitted from each LED of the light source section 16 and the amount of light in each wavelength of the outside light are stored therein.

The mode switching section 21 switches an operation mode in the spectrometer 1. Specifically, the mode switching section 21 switches the operation mode to any of a calibration mode and a measurement mode.

The calibration mode is an operation mode for setting the amount of light in each wavelength of the reference light emitted from the light source section 16, using the object X as a reference calibration object.

The measurement mode is an operation mode for measuring the spectral characteristics of the object X.

The mode switching section 21 first switches the operation mode to the calibration mode at the time of the start of measurement through the spectrometer 1, and switches the operation mode to the measurement mode after this calibration mode is terminated. Meanwhile, the switching timing of the operation mode in the mode switching section 21 is not limited thereto. For example, the operation mode may be switched through a setting input performed by a measurer.

The filter driving circuit 22 sets a voltage applied to the electrostatic actuator 56 of the variable wavelength interference filter 5. In addition, the mode switching section 21 controls the voltage control circuit 15, applies the set voltage (step voltage) to the electrostatic actuator 56, and changes the size of the gap G1 between the reflective films.

Here, the filter driving circuit 22 switches a step voltage applied to the electrostatic actuator 56 in stages in each of the operation modes. Thereby, the wavelength of light that passes through the variable wavelength interference filter 5 is switched in stages.

The outside light analysis section 23 analyzes the outside light reflected from the object X in the calibration mode. Here, in the calibration mode, a reference calibration object of which the reflectance is identified in advance, for example, such as a white calibration plate is used as the object X. In addition, the calibration mode of the embodiment is performed in a state where the light source section 16 is stopped. Therefore, in the calibration mode, only the outside light reflected from the object X is incident on the variable wavelength interference filter 5, and the light passing through the variable wavelength interference filter 5 is received in the detector 11.

The outside light analysis section 23 acquires the spectral characteristics of the outside light, that is, the amount of light of each wavelength in the outside light, on the basis of the detection signal which is output from the detector 11. The reference light setting section 24 sets the amount of light emitted from each of the LEDs 161 of the light source section 16, on the basis of the spectral characteristics of the outside light acquired by the outside light analysis section 23, the transmission characteristics of the variable wavelength interference filter 5 stored in the storage section 30, and the sensitivity characteristics of the detector 11.

Generally, when the reference light and the outside light from the light source section 16 are reflected from the object X, and light of wavelength λ is extracted in the reflected light thereof by the variable wavelength interference filter 5 and received in the detector 11, an output value $F_\lambda$ of the light of wavelength λ from the detector 11 is expressed as shown in the following Expression (1). That is, the output value $F_\lambda$ is equal to the sum of an outside light characteristic value $F_{O\lambda}$ which is an output value based on outside light components in the reflected light and a reference light characteristic value $F_{L\lambda}$ which is an output value based on the reference light.

$$F_{n\lambda}=F_{O\lambda}+F_{L\lambda} \quad (1)$$

Meanwhile, the outside light characteristic value $F_{O\lambda}$ is an output value from the detector 11 in a state where the light source section 16 is stopped (state where there is no reference light), that is, the spectral characteristics of the outside light acquired (analyzed) by the outside light analysis section 23. Here, when the amount of light for wavelength λ of the actual outside light is set to $A_{O\lambda}$, the outside light characteristic value $F_{O\lambda}$ is expressed as the following Expression (2), using the sensitivity characteristics (relative output) for wavelength λ of the detector 11 as $f_{d\lambda}$, and the transmission characteristics (transmittance) for wavelength λ of the variable wavelength interference filter 5 as $f_{f\lambda}$. Similarly, the reference light characteristic value $F_{L\lambda}$ is expressed as the following Expression (3), using a sensitivity characteristic $f_{d\lambda}$ for wavelength λ, a transmission characteristic $f_{f\lambda}$, and actual light (the amount of light emitted from the LEDs 161) $A_{L\lambda}$ of the light of wavelength λ emitted from the light source section 16.

$$F_{O\lambda}=A_{O\lambda}\times f_{d\lambda}\times f_{f\lambda} \quad (2)$$

$$F_{L\lambda}=A_{L\lambda}\times f_{d\lambda}\times f_{f\lambda} \quad (3)$$

Here, the spectral characteristic in the reference calibration object is equal to a set value which is set in advance. Therefore, in the calibration mode, the reference light setting section 24 sets $A_{L\lambda}$ so that an output value $F_{n\lambda}$ output from the detector 11 is equal to this set value. For example, when a reference white plate having a uniform reflectance for each wavelength is used as the reference calibration object, a value of the amount $A_{L\lambda}$ of light emitted from the LEDs 161 corresponding to each wavelength is set so that the measured value $F_{n\lambda}$ for light of each wavelength is equal to a set value S.

When a reference white plate is used as the reference calibration object, the reference light setting section 24 calculates a value of the amount $A_{L\lambda}$ of light emitted from the LEDs 161 corresponding to each wavelength, on the basis of the following Expression (4). Thereby, the amount of light emitted from each of the LEDs 161 in the light source section 16 is set.

$$A_{L\lambda}=(S-F_{O\lambda})/(f_{d\lambda}\times f_{f\lambda}) \quad (4)$$

Herein, a value which is set in advance with respect to the reference calibration object can be used as the set value S. Meanwhile, when things other than a white plate are used as the reference calibration object, a set value $S_\lambda$ for each wavelength is set in accordance with the reflectance for each wavelength of the reference calibration object. In this case, the set value $S_\lambda$ which is different for each wavelength may be set.

In addition, a maximum light value, for example, in the amount of light for each wavelength of the outside light acquired by the outside light analysis section 23 may be adopted as the set value S. In this case, it is not necessary to turn on the LEDs 161 with respect to the wavelength corresponding to the maximum light value, and thus power saving can be achieved. Such a set value S is effective, particularly, when the amount of the outside light is large.

In addition, the following value may be set as the set value S. That is, when the amount of light emitted from the LEDs 161 corresponding to each wavelength is set (all turned on) to the maximum amount of light emitted, the reference light setting section 24 preliminarily calculates an output value $F_\lambda$ which is output from the detector 11, for example, on the basis of Expression (1). A minimum value in each output value $F_\lambda$ which is preliminarily calculated is set to the set value S. In this case, it is possible to perform the setting of maximizing the amount of the reference light in consideration of the outside light.

In the measurement mode, the light source driving section 25 drives the light source section 16 by controlling the light source driving circuit 17, and emits the reference light to the object X. At this time, the light source driving section 25 controls the light source driving circuit 17 on the basis of the amount of light emitted from each of the LEDs 161 which is set by the reference light setting section 24.

In the measurement mode, the measurement section 26 acquires the amount of light for each wavelength on the basis of the detection signal which is output from the detector 11, that is, acquires the spectral characteristics of the object X.

Spectrometry Method Making use of Spectrometer

Next, a spectrometry method making use of the above-mentioned spectrometer 1 will be described with reference to the accompanying drawings.

Figure 8:
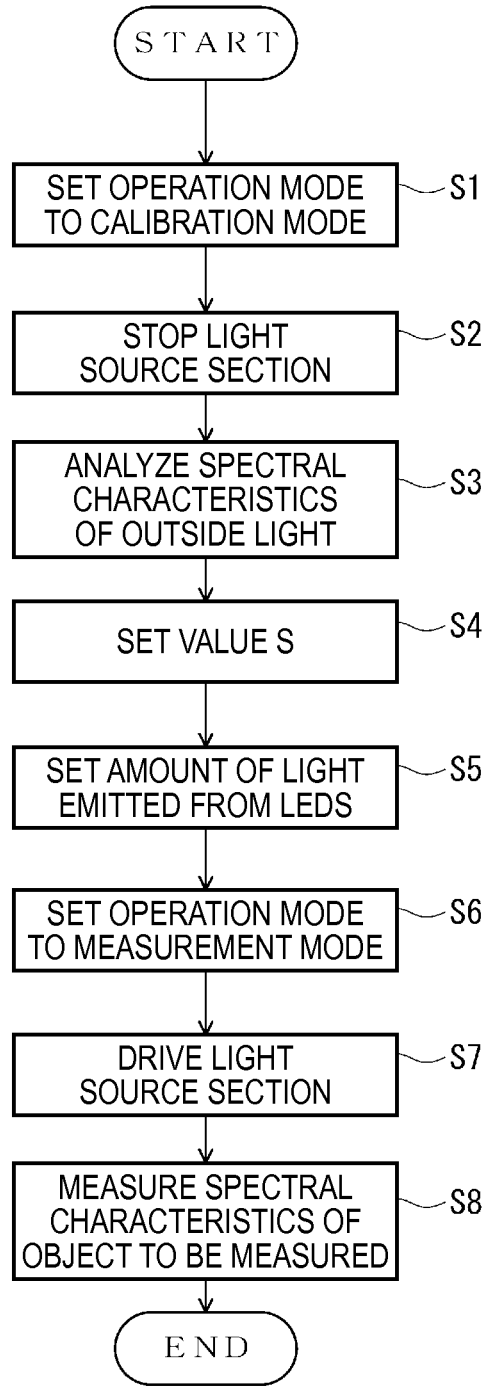
FIG. 8 is a flow diagram illustrating a spectrometry method making use of the spectrometer according to the first embodiment.

FIG. 8 is a flow diagram illustrating a spectrometry method according to the embodiment.

As shown in FIG. 8, in the spectrometry method according to the embodiment, at the time of the start of measurement, or when a setting input in which the light source section 16 is calibrated by a measurer is performed, the mode switching section 21 sets the operation mode to the calibration mode (S1). When the operation mode is set to the calibration mode in S1, the control circuit section 20 performs a calibration for setting the reference light of the light source section 16. In this calibration, the light source section 16 is calibrated using the object X as a reference calibration object. In the embodiment, as the reference calibration object, a reference white plate is used as mentioned above.

In this calibration, the driving of the light source section 16 is first stopped by the light source driving section 25 (S2).

Thereafter, the spectral characteristics of the outside light are analyzed by the outside light analysis section 23 (S3). In S3, the driving voltage applied to the electrostatic actuator 56 of the variable wavelength interference filter 5 is sequentially switched by controlling the filter driving circuit 22. Thereby, the wavelength of light, reflected from the object X, which passes through the variable wavelength interference filter 5 is sequentially changed and is received in the detector 11. The outside light analysis section 23 acquires a detection signal which is output from the detector 11, and acquires the amount of light in each wavelength of the outside light. That is, the outside light analysis section 23 acquires an outside light characteristic value $F_{O\lambda}$.

Thereafter, the reference light setting section 24 sets the set value S (S4).

In the setting of the set value S, as mentioned above, the set value S which is set in advance with respect to the reference calibration object may be read and set, and the maximum light value in the amount of light for each wavelength of the outside light, for example, acquired by the outside light analysis section 23 may be adopted. In addition, an output value $F_\lambda$ when the amount of light emitted from the LEDs 161 corresponding to each wavelength is set to the maximum amount of light emitted may be preliminarily calculated, and the minimum value in each output value $F_\lambda$ which is preliminarily calculated may be set to the set value S. Further, a process of selecting any of the above values may be performed on the basis of the amount of the outside light.

The reference light setting section 24 sets the amount $A_{L\lambda}$ of light emitted from each of the LEDs 161 with respect to each wavelength, on the basis of the above-mentioned Expression (4) (S5).

After the above-mentioned calibration is terminated, the mode switching section 21 switches the operation mode to the measurement mode (S6). In this measurement mode, a measurer installs an object to be measured as the object X instead of a reference white plate, and measures the spectral characteristics of the object to be measured.

In this measurement, the light source driving section 25 turns on each of the LEDs 161 on the basis of the amount $A_{L\lambda}$ of light emitted from each of the LEDs 161 which is set by S5 (S7).

Thereafter, the spectral characteristics of the object to be measured by the measurement section 26 are measured (S8).

In S8, the driving voltage applied to the electrostatic actuator 56 of the variable wavelength interference filter 5 is sequentially switched by controlling the filter driving circuit 22. Thereby, the wavelength of light, reflected from the object to be measured, which passes through the variable wavelength interference filter 5 is sequentially changed and is received in the detector 11. The measurement section 26 acquires a detection signal which is output from the detector 11, and acquires the amount of light in each wavelength of the object to be measured, that is, measures the spectral characteristics of the object to be measured.

Operations and Effects of the Embodiment

In the spectrometer 1 of the embodiment, the outside light analysis section 23 analyzes the characteristics of the outside light in the calibration mode, and the reference light setting section 24 sets the amount of light emitted from the LEDs 161 of the light source section 16 which corresponds to each wavelength, on the basis of the analyzed characteristics of the outside light.

For this reason, the reference light can be set inconsideration of the outside light, and the spectral characteristics of the object X can be measured with a high degree of accuracy in the measurement mode even when outside light components are contained. In addition, the reference light of the light source section 16 is adjusted in accordance with the characteristics of the outside light in this manner, and thus it is possible to simplify a gain adjustment, a correction and the like, for example, in the measurement mode, and to rapidly and easily measure the spectral characteristics with a high degree of accuracy.

In addition, as compared to a configuration in which the reference light is emitted from one light source, for example, such as a halogen lamp, it is possible to particularly set the amount of light emitted from the LEDs 161 in each wavelength region. Therefore, since there is no wavelength region falling short of the amount of light, it is possible to increase the signal strength in each wavelength, and to achieve an improvement in the S/N ratio.

In the embodiment, when the operation mode is switched to the calibration mode by the mode switching section 21, the light source driving section 25 stops the driving of the light source section 16. Thereby, only the outside light reflected from the object X (reference calibration object) is incident on the detector 11, and thus it is possible to measure the amount of the outside light in each wavelength.

The amount of light emitted from each of the LEDs 161 is set on the basis of such an amount of the outside light, and thus light of each wavelength in the reference light can be set to an optimum amount of light corresponding to the reference calibration object. Therefore, it is possible to further improve measurement accuracy by performing the operation in the measurement mode using the reference light which is set to such an optimum amount of light.

In the embodiment, the amount of light emitted from the LEDs 161 is calculated on the basis of the above-mentioned Expression (4). Therefore, it is possible to calculate the amount of light emitted from the LEDs 161 in consideration of the sensitivity characteristics of the detector 11 and the spectral characteristics of the variable wavelength interference filter 5, in addition to the spectral characteristics of the outside light. Therefore, in the measurement of the spectral characteristics of the object X in the measurement mode, it is possible to obtain a measurement result having a higher level of accuracy. In addition, it is possible to increase the amount of light emitted from the LEDs 161 with respect to the low sensitivity band in which the sensitivity of the detector 11 or the transmittance of the variable wavelength interference filter is low. Therefore, the signal strength of the low sensitivity band increases, thereby allowing the S/N ratio to be improved.

In the embodiment, a plurality of LEDs 161 corresponding to each wavelength are provided, and the reference light setting section 24 sets the reference light emitted from the light source section 16 by setting the number of LEDs 161 turned on. In such a configuration, the light source driving section 25 just switches a switch circuit of the light source driving circuit 17, so that it is possible to easily change the amount of light in each wavelength of the reference light of the light source section 16, and to simplify the configuration.

Second Embodiment

Next, a second embodiment of the invention will be described with reference to the accompanying drawings. Meanwhile, in the description of the following embodiment, the same components as those in the first embodiment are designated by the same reference numerals and signs, and the description thereof will be omitted or simplified.

In the above-mentioned first embodiment, an example has been illustrated in which the outside light analysis section 23 analyzes the spectral characteristics of the outside light in a state where reference light irradiation is stopped. On the other hand, the embodiment is different from the above-mentioned first embodiment, in that the outside light analysis section determines whether the amount of the outside light in each wavelength is larger than a predetermined value in a state where reference light irradiation is performed from the light source section 16.

Figure 9:
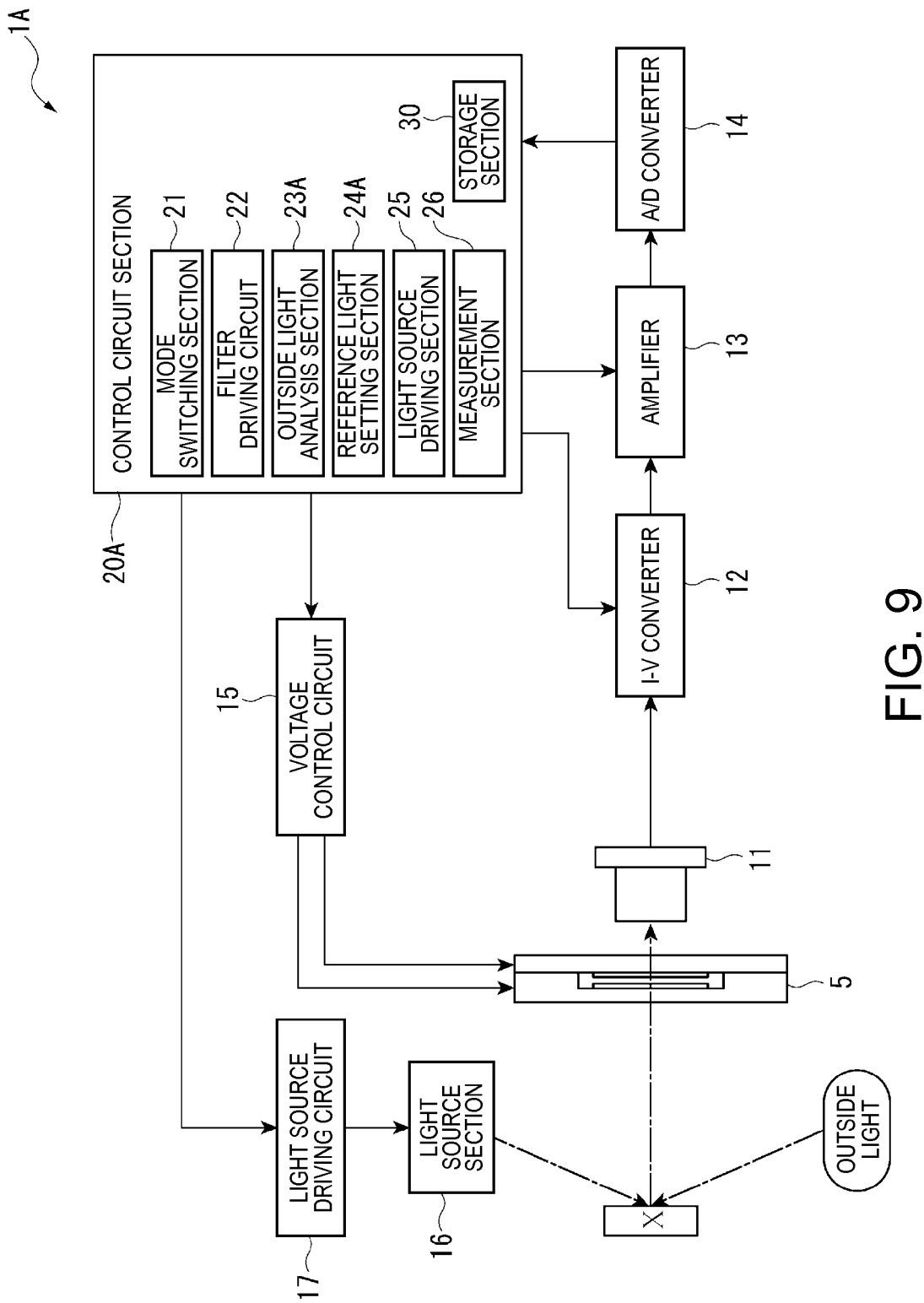
FIG. 9 is a block diagram illustrating a schematic configuration of a spectrometer according to a second embodiment of the invention.

FIG. 9 is a diagram illustrating a schematic configuration of a spectrometer according to the second embodiment.

As shown in FIG. 9, a spectrometer 1A of the embodiment includes a variable wavelength interference filter 5, a detector 11 (detection section), an I-V converter 12, an amplifier 13, an A/D converter 14, a voltage control circuit 15, a light source section 16, a light source driving circuit 17, and a control circuit section 20A.

In addition, a control circuit section 20A of the embodiment includes a mode switching section 21, a filter driving circuit 22, an outside light analysis section 23A, a reference light setting section 24A, a light source driving section 25, a measurement section 26, and a storage section 30.

In the spectrometer 1A of the embodiment, when the operation mode is switched to the calibration mode by the mode switching section 21, the light source driving section 25 performs a calibration in a state where the LEDs 161 of the light source section 16 is turned on.

Specifically, the outside light analysis section 23A determines whether the output value from the detector 11 is over a range in a state where the LEDs 161 of the light source section 16 are turned on. Here, when the output value from the detector 11 for each wavelength exceeds a specified value which is set in advance, it means that the amount of the outside light is large, that is, the amount of the outside light exceeds a predetermined value. Therefore, when the output value from the detector 11 for each wavelength exceeds a specified value which is set in advance, the outside light analysis section 23A determines the value to be over a range.

The reference light setting section 24A reduces the amount of light emitted from the LEDs corresponding to the wavelength determined to be over a range by the outside light analysis section 23A. Specifically, the reference light setting section 24A causes the number of LEDs turned on corresponding to the wavelength in which the amount of the outside light is determined to be large to be reduced by one.

Spectrometry Method of Spectrometer

Next, a spectrometry method making use of the above-mentioned spectrometer 1A will be described with reference to the accompanying drawings.

Figure 10:
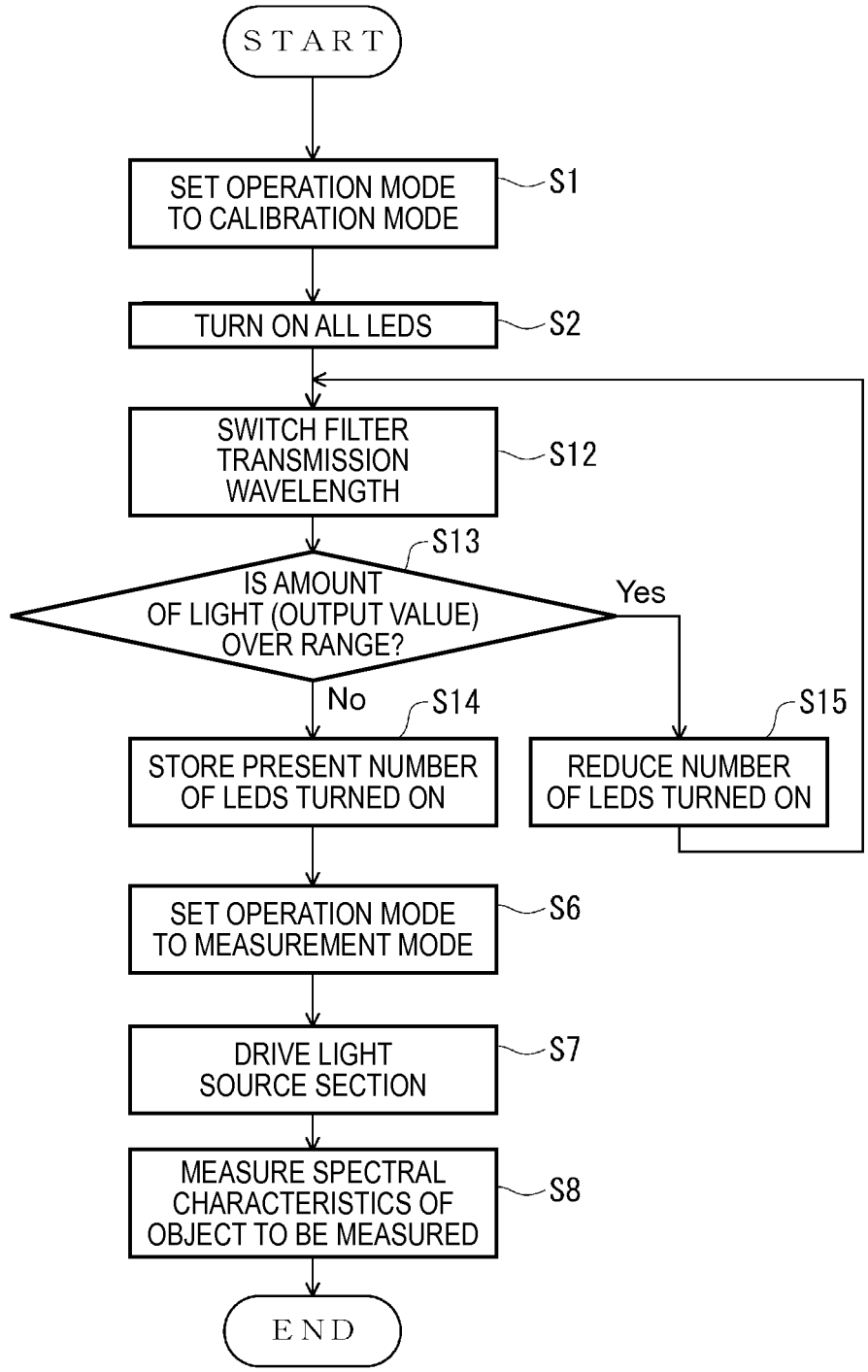
FIG. 10 is a flow diagram illustrating a spectrometry method making use of the spectrometer according to the second embodiment.

FIG. 10 is a flow diagram illustrating a spectrometry method of the spectrometer 1A.

As shown in FIG. 10, similarly to the above-mentioned first embodiment, the spectrometer 1A of the embodiment performs step S1 at the time of the start of measurement, or when a setting input in which the light source section 16 is calibrated by a measurer is performed. The mode switching section 21 sets the operation mode to the calibration mode.

When the operation mode is set to the calibration mode in S1, the control circuit section 20A performs a calibration for setting the reference light of the light source section 16. In this calibration, similarly to the first embodiment, the light source section 16 is calibrated using the object X as a reference calibration object (reference white plate). In the calibration of the embodiment, the light source driving section 25 first turns on all the LEDs 161 of the light source section 16 (S11).

Thereafter, the filter driving circuit 22 sequentially switches a driving voltage applied to the electrostatic actuator 56 of the variable wavelength interference filter 5 (S12). Thereby, the wavelength of light, reflected from the object X, which passes through the variable wavelength interference filter 5 is sequentially changed and is received in the detector 11. At this time, the outside light analysis section 23A stores an output value (the amount of light) for each wavelength, which is output from the detector 11, in the storage section 30.

Thereafter, the outside light analysis section 23A determines whether the output value of S12 stored in the storage section 30 is over a range (S13). That is, the outside light analysis section 23A determines whether the output value of S12 for each wavelength exceeds a predetermined specified value.

In S13, when the output value is determined to be equal to or less than the specified value by the outside light analysis section 23A (when it is determined to be "No"), the reference light setting section 24A stores the present amount of light emitted from the LEDs 161 (the number of LEDs 161 turned on corresponding to each wavelength), as the set amount of light emitted, in the storage section 30 (S14).

On the other hand, when it is determined in S13 by the outside light analysis section 23A that there is an output value exceeding a specified value which is set in advance among the output values corresponding to each wavelength (when it is determined to be "Yes"), the reference light setting section 24A causes the number of LEDs 161 turned on corresponding to the wavelength exceeded by the output value to be reduced by one (S15). The reference light setting section 24A stores the amount of light emitted (the number of turn-on) from the LEDs 161 corresponding to each wavelength in the storage section 30.

After step S15, steps S12 and S13 are repeated. That is, until the output value corresponding to each wavelength is equal to or less than the specified value, steps S12, S13, and S15 are repeatedly performed.

After the output value corresponding to each wavelength is equal to or less than the specified value, and step S14 is performed, the spectrometer 1A performs measurement steps of S6 to S8 similarly to the above-mentioned first embodiment, and measures the spectral characteristics of the object to be measured.

Operations and Effects of the Embodiment

In the spectrometer 1A of the embodiment, in the calibration mode, the light source driving section 25 performs turn-on on the basis of the amount of light emitted from each of the LEDs 161 which is stored in the storage section 30 (in an initial state, all turn-on). The outside light analysis section 23A determines whether the amount of light in each wavelength detected by the detector 11 is equal to or more than a predetermined specified value, that is, whether the outside light is equal to or more than a predetermined value, and the reference light setting section 24A reduces the amount of light emitted from the light-emitting elements which corresponds to the wavelength in which the amount of light exceeds a specified value and stores the reduced amount thereof in the storage section 30.

In such a configuration, it is also possible to set the reference light corresponding to the outside light, similarly to the above-mentioned first embodiment. Therefore, it is possible to simplify a gain adjustment, a correction and the like in the measurement mode, and to rapidly and easily measure the spectral characteristics with a high degree of accuracy. In addition, as compared to a configuration in which the reference light is emitted from one light source such as a halogen lamp, it is possible to particularly set the amount of light emitted from the light-emitting elements in each wavelength region. Therefore, since there is no wavelength region falling short of the amount of light, it is possible to increase the signal strength in each wavelength, and to achieve an improvement in the S/N ratio.

In addition, as compared to the first embodiment, it is not necessary to perform an arithmetic operation of the amount of light emitted which is based on Expression (4), and thus processes can be simplified.

Third Embodiment

Next a third embodiment of the invention will be described with reference to the accompanying drawings.

In the above-mentioned first embodiment, the outside light analysis section 23 analyzes the spectral characteristics of the outside light on the basis of the output value acquired by the detector 11. In the second embodiment, the outside light analysis section 23 analyzes whether the amount of the outside light is equal to or more than the specified value on the basis of the output value acquired by the detector 11.

On the other hand, in the embodiment, an outside light sensor that detects only the outside light is separately included, and the outside light analysis section detects the outside light on the basis of a detection signal from the outside light sensor.

Figure 11:
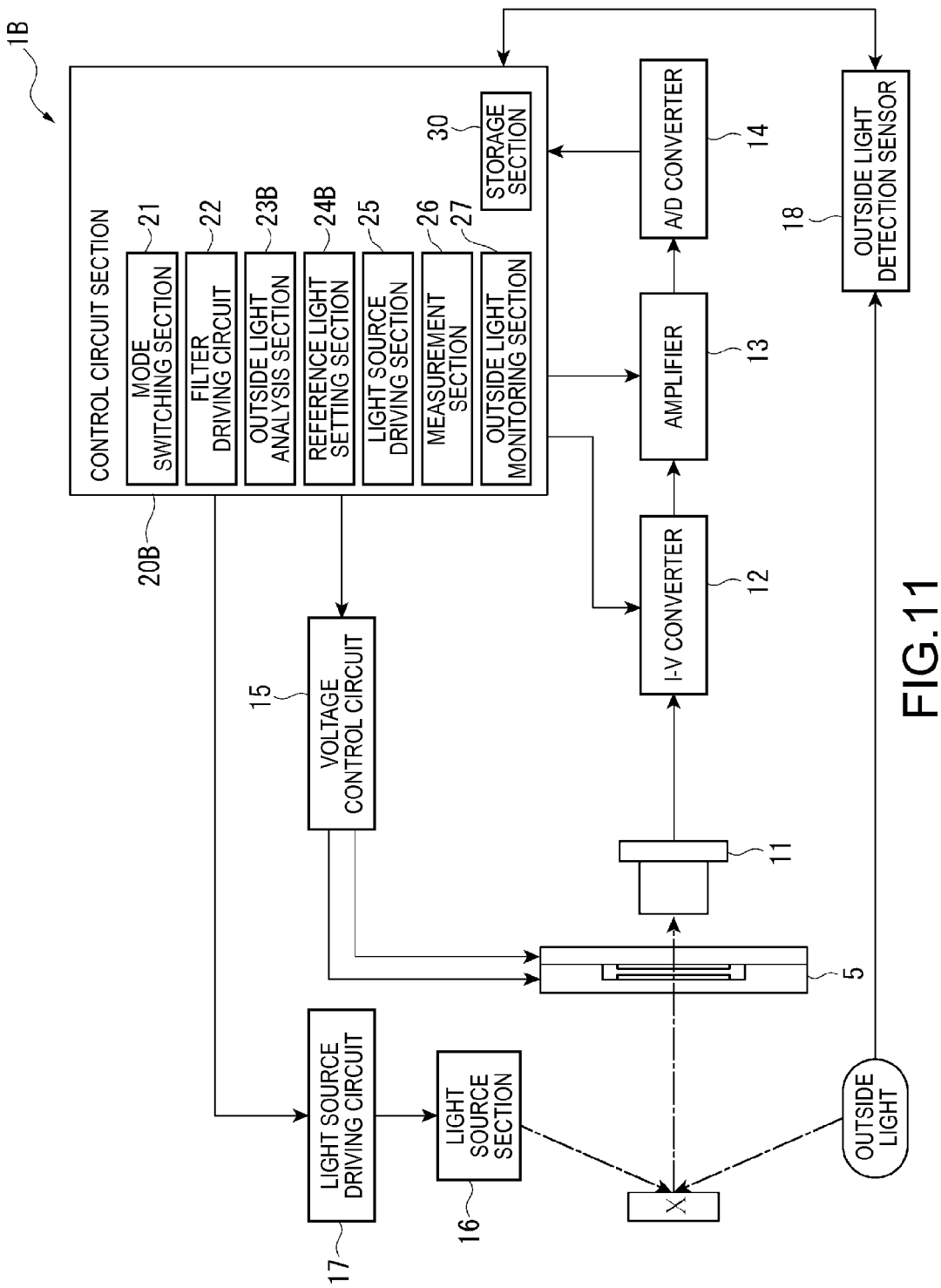
FIG. 11 is a block diagram illustrating a schematic configuration of the spectrometer according to the second embodiment of the invention.

FIG. 11 is a diagram illustrating a schematic configuration of a spectrometer 1B according to the third embodiment.

As shown in FIG. 11, the spectrometer 1B of the embodiment includes a variable wavelength interference filter 5, a detector 11 (detection section), an I-V converter 12, an amplifier 13, an A/D converter 14, a voltage control circuit 15, a light source section 16, a light source driving circuit 17, an outside light detection sensor 18 which is an outside light detection section of the embodiment of the invention, and a control circuit section 20B.

The outside light detection sensor 18 is a sensor that analyzes the spectral characteristics of the outside light. The outside light detection sensor 18 is a sensor that detects only the outside light except for the reference light, and measures the amount of light for each wavelength of the outside light. As such an outside light detection sensor, for example, a sensor including a second variable wavelength interference filter and a second detector which have the same configurations as those of the variable wavelength interference filter 5 and the detector 11 can be illustrated by way of example.

The control circuit section 20B of the embodiment includes a mode switching section 21, a filter driving circuit 22, an outside light analysis section 23B, a reference light setting section 24B, a light source driving section 25, a measurement section 26, an outside light monitoring section 27, and a storage section 30. The storage section 30 also functions as an outside light characteristic storage section of the embodiment of the invention, and stores the spectral characteristics of the outside light acquired by the outside light analysis section 23B.

The outside light analysis section 23B analyzes the spectral characteristics of the outside light on the basis of a detection signal which is input not from the detector 11, but from the outside light detection sensor 18.

In the embodiment, similarly to the first embodiment, in the calibration mode, the outside light analysis section 23B acquires the spectral characteristics of the outside light, and the reference light setting section 24B calculates the amount of light emitted from the LEDs 161 corresponding to each wavelength, on the basis of the acquired spectral characteristics. At this time, in the embodiment, step S2 shown in FIG. 8 is not required, and the light source section 16 may be being driven.

Meanwhile, the outside light analysis section 23B and the reference light setting section 24B may determine whether the amount of light for each wavelength of the outside light exceeds a predetermined value, for example, as in the second embodiment, and may reduce the number of LEDs 161 turned on when the predetermined value is exceeded.

In addition, even when the measurement mode is set by the mode switching section 21, the outside light analysis section 23B of the embodiment analyzes the spectral characteristics of the outside light, on the basis of the detection signal of the outside light detection sensor 18.

Further, the control circuit section 20B of the spectrometer 1B of the embodiment includes the outside light monitoring section 27 that monitors a change in the amount of light for each wavelength of the outside light. When the amount of light for each wavelength of the outside light changes, the outside light monitoring section 27 calculates a variation thereof. When the variation of the outside light is calculated by the outside light monitoring section 27, the reference light setting section 24B of the embodiment corrects the amount of light emitted from the LEDs 161 in accordance with the variation, and stores the corrected amount of light emitted of the each of the LEDs 161 in the storage section 30.

Specifically, when the amount of the outside light increases by a predetermined amount, the reference light setting section 24B causes the number of LEDs 161 turned on corresponding to the wavelength in which the amount of light changes to be reduced by one. In addition, when the amount of the outside light is reduced by a predetermined amount, the number of LEDs 161 turned on corresponding to the wavelength in which the amount of light changes is caused to be increased by one.

In addition, when the amount of light emitted from the LEDs 161 which is stored in the storage section 30 is updated, the light source driving section 25 drives the LEDs 161 on the basis of the amount of light emitted after the update.

Operations and Effects of the Embodiment

The spectrometer 1B of the embodiment includes the outside light detection sensor 18 that detects the amount of light for each wavelength of the outside light. The outside light analysis section 23B analyzes the spectral characteristics of the outside light on the basis of the detection signal of the outside light detection sensor 18.

In such a configuration, even when the operation mode is set to the measurement mode, it is possible to analyze the spectral characteristics of the outside light through the outside light analysis section 23, and to detect a change in the outside light during the measurement.

In addition, the storage section 30 of the embodiment stores the spectral characteristics of the outside light. When there is a change in the amount of the outside light, the outside light monitoring section 27 calculates a variation thereof on the basis of the amount of light for each wavelength of the outside light which is stored in the storage section 30 and the amount of light for each wavelength of the outside light which is acquired by the outside light analysis section 23, and the reference light setting section 24B corrects the amount of light emitted from the LEDs 161 on the basis of the variation. For this reason, when there is a change in the outside light even during the operation of the measurement mode, it is possible to reset the amount of light for each wavelength of the reference light on the basis of the variation thereof. Thereby, it is possible to suppress a decrease in measurement accuracy due to a change in the amount of the outside light during the measurement.

MODIFICATION EXAMPLE

Meanwhile, the invention is not limited to the above-mentioned embodiments, but modifications, improvements and the like within the scope capable of achieving the objects of the invention are included in the invention.

For example, in the above-mentioned first to third embodiments, an example is illustrated in which the amount of light emitted for each wavelength is adjusted by changing the number of plural LEDs 161 turned on, but the amount of light emitted may be adjusted by changing a driving voltage applied to one LED 161. In addition, the LEDs 161 are different in the maximum amount of light emitted depending on the emission wavelength and the like. Therefore, the number of LEDs 161 corresponding to the wavelength in which the maximum amount of light emitted is small may be two or more, and the amount of light emitted may be changed by changing both the number of LEDs 161 and the driving voltage thereof. In this manner, it is possible to more particularly adjust the amount of light emitted by changing the driving voltage applied to the LEDs 161.

An example is illustrated in which the light source section 16 includes the LEDs 161 as light-emitting elements, but the types of the light-emitting elements are not particularly limited as long as a plurality of light-emitting elements corresponding to each wavelength are provided. For example, as the light-emitting element, a laser light source may be used, and both the LED and the laser light source may be combined.

In addition, in the above-mentioned embodiment, the variable wavelength interference filter 5 is illustrated as the wavelength selection element, but the transmission wavelength may be selected by switching a plurality of color filters or wavelength fixed interference filters, for example, having different transmission wavelengths.

As the gap amount change portion of the variable wavelength interference filter 5, the electrostatic actuator 56 that fluctuates the size of the gap G1 between the reflective films through electrostatic attractive force due to the voltage application is illustrated, but the gap amount change portion is not limited thereto.

For example, a dielectric actuator may be used in which a first dielectric coil is disposed instead of the fixed electrode 561, and a second dielectric coil or a permanent magnet is disposed instead of the movable electrode 562.

Further, a piezoelectric actuator may be used instead of the electrostatic actuator 56. In this case, for example, a lower electrode layer, a piezoelectric film, and an upper electrode layer are laminated on the holding portion 522, and a voltage applied between the lower electrode layer and the upper electrode layer is made variable as an input value, thereby allowing the holding portion 522 to be bent by the expansion and contraction of the piezoelectric film.

In addition, for example, the space between the fixed substrate 51 and the movable substrate 52 is made airtight, and internal air pressure is changed, so that the variable wavelength interference filter that changes the size of the gap G1 between the reflective films may be used. In this case, the air of the airtight space is pressurized or depressurized using, for example, a pump or the like, but it is possible to perform the same operation as that of the above-mentioned embodiments by changing a voltage at the time of driving the pump using the filter driving circuit 22 and the voltage control circuit 15. Besides, a specific structure at the time of carrying out the invention can be appropriately changed to another structure within the scope capable of achieving the objects of the invention.

The entire disclosure of Japanese Patent Application No. 2011-240914, filed Nov. 2, 2011 is expressly incorporated by reference herein.

What is claimed is:

1. A spectrometer comprising:
    a light source section that includes a plurality of light-emitting elements having different emission wavelengths and emits reference light, with which light emitted from the light-emitting elements is mixed, to an object;
    a wavelength selection element that selectively extracts light of a predetermined wavelength from light reflected or transmitted from or through the object;
    a detection section that detects the amount of light extracted from the wavelength selection element; and
    a control section,
    wherein the control section includes
        a mode switching section that switches a calibration mode for performing a calibration using the object as a reference calibration object, and a measurement mode for measuring spectral characteristics of an object to be measured using the object as the object to be measured,
        an outside light analysis section that analyzes characteristics of outside light in the calibration mode,
        a reference light setting section that sets the amount of light emitted from each light-emitting element of the light source section, in the calibration mode, on the basis of the characteristics of the outside light analyzed by the outside light analysis section, and
        a light source driving section that drives the light-emitting elements, in the measurement mode, on the basis of the amount of light emitted which is set by the reference light setting section.

2. The spectrometer according to claim 1, wherein the outside light analysis section acquires the amount of light for each wavelength of the outside light, as the characteristics of the outside light, and
    the reference light setting section calculates the amount of light emitted from the light-emitting elements corresponding to each wavelength, on the basis of the amount of light for each wavelength of the outside light.

3. The spectrometer according to claim 2, wherein the control section includes a storage section that stores sensitivity characteristics of the detection section for each wavelength capable of being selected by the wavelength selection element, and spectral characteristics of the wavelength selection element for each wavelength capable of being selected by the wavelength selection element, and
    the reference light setting section calculates the amount of light emitted from the light-emitting elements corresponding to each wavelength so that the sum of an outside light characteristic value calculated on the basis of the amount of light for each wavelength of the outside light, the sensitivity characteristics of the detection section and the spectral characteristics of the wavelength selection element, and a reference light characteristic value calculated on the basis of the amount of light emitted from the light-emitting elements for each wavelength, the sensitivity characteristics of the detection section and the spectral characteristics of the wavelength selection element is equal to a set value corresponding to reflectance for each wavelength of the reference calibration object.

4. The spectrometer according to claim 2, further comprising an outside light detection section that detects the amount of light for each wavelength of the outside light,
    wherein the outside light analysis section analyzes the characteristics of the outside light on the basis of a detection result of the outside light detection section.

5. The spectrometer according to claim 3, further comprising an outside light detection section that detects the amount of light for each wavelength of the outside light,
    wherein the outside light analysis section analyzes the characteristics of the outside light on the basis of a detection result of the outside light detection section.

6. The spectrometer according to claim 2, wherein the wavelength selection element is a variable wavelength interference filter including:
    a first substrate;
    a second substrate that faces the first substrate;
    a first reflective film provided on the first substrate;
    a second reflective film, provided on the second substrate, which faces the first reflective film with a gap between the reflective films interposed therebetween; and
    a gap change section that changes a size of the gap between the reflective films.

7. The spectrometer according to claim 3, wherein the wavelength selection element is a variable wavelength interference filter including:
    a first substrate;
    a second substrate that faces the first substrate;
    a first reflective film provided on the first substrate;

a second reflective film, provided on the second substrate, which faces the first reflective film with a gap between the reflective films interposed therebetween; and a gap change section that changes a size of the gap between the reflective films.

8. The spectrometer according to claim 1, further comprising a light-emission amount storage section that stores the amount of light emitted from the light-emitting elements corresponding to each wavelength, wherein the light source driving section drives the light source section, in the calibration mode, on the basis of the amount of light emitted from the light-emitting elements which is stored in the light-emission amount storage section, the outside light analysis section determines whether the amount of light for each wavelength of the outside light exceeds a predetermined value, as the characteristics of the outside light, and the reference light setting section reduces the amount of light emitted from the light-emitting elements corresponding to the wavelength, when the amount of light for the wavelength of the outside light exceeds the predetermined value.

9. The spectrometer according to claim 8, further comprising an outside light detection section that detects the amount of light for each wavelength of the outside light, wherein the outside light analysis section analyzes the characteristics of the outside light on the basis of a detection result of the outside light detection section.

10. The spectrometer according to claim 8, wherein the wavelength selection element is a variable wavelength interference filter including:

a first substrate;

a second substrate that faces the first substrate;

a first reflective film provided on the first substrate;

a second reflective film, provided on the second substrate, which faces the first reflective film with a gap between the reflective films interposed therebetween; and a gap change section that changes a size of the gap between the reflective films.

11. The spectrometer according to claim 1, further comprising an outside light detection section that detects the amount of light for each wavelength of the outside light, wherein the outside light analysis section analyzes the characteristics of the outside light on the basis of a detection result of the outside light detection section.

12. The spectrometer according to claim 11, further comprising:

an outside light characteristic storage section that stores the amount of light for each wavelength of the outside light; and an outside light monitoring section that calculates a variation in the amount of light for each wavelength, when there is a change in the amount of the outside light in the measurement mode, wherein the reference light setting section corrects the amount of light emitted from the light-emitting elements, on the basis of the variation in the amount of light which is calculated by the outside light monitoring section.

13. The spectrometer according to claim 11, wherein the wavelength selection element is a variable wavelength interference filter including:

a first substrate;

a second substrate that faces the first substrate;

a first reflective film provided on the first substrate;

a second reflective film, provided on the second substrate, which faces the first reflective film with a gap between the reflective films interposed therebetween; and a gap change section that changes a size of the gap between the reflective films.

14. The spectrometer according to claim 1, wherein the wavelength selection element is a variable wavelength interference filter including:

a first substrate;

a second substrate that faces the first substrate;

a first reflective film provided on the first substrate;

a second reflective film, provided on the second substrate, which faces the first reflective film with a gap between the reflective films interposed therebetween; and a gap change section that changes a size of the gap between the reflective films.

15. The spectrometer according to claim 14, wherein the wavelength selection element is a variable wavelength interference filter including:

a first substrate;

a second substrate that faces the first substrate;

a first reflective film provided on the first substrate;

a second reflective film, provided on the second substrate, which faces the first reflective film with a gap between the reflective films interposed therebetween; and a gap change section that changes a size of the gap between the reflective films.

* * * * *